United States Patent
Rappoport et al.

(10) Patent No.: US 8,700,382 B2
(45) Date of Patent: Apr. 15, 2014

(54) PERSONAL TEXT ASSISTANT

(75) Inventors: Ari Rappoport, Jerusalem (IL); Uri Avissar, Kfar-Sava (IL); Alex Ben-Tal, Petach Tikva (IL); Iddo Levin, Tel-Aviv (IL)

(73) Assignee: Yissum Research Development Company of the Hebrew University of Jerusalem, Ltd., Jerusalem (IL)

( * ) Notice: Subject to any disclaimer, the term of this patent is extended or adjusted under 35 U.S.C. 154(b) by 964 days.

(21) Appl. No.: 12/543,979

(22) Filed: Aug. 19, 2009

(65) Prior Publication Data

US 2009/0306959 A1 Dec. 10, 2009

Related U.S. Application Data

(63) Continuation-in-part of application No. PCT/IL2008/000214, filed on Feb. 19, 2008.

(60) Provisional application No. 60/890,506, filed on Feb. 19, 2007.

(51) Int. Cl.
*G06F 17/21* (2006.01)

(52) U.S. Cl.
USPC ............ 704/1; 704/2; 704/5; 704/8; 715/230; 434/178

(58) Field of Classification Search
USPC .................... 704/2, 5, 8, 1; 715/230; 434/178
See application file for complete search history.

(56) References Cited

U.S. PATENT DOCUMENTS

| 6,438,515 | B1* | 8/2002 | Crawford et al. | 704/5 |
|---|---|---|---|---|
| 7,818,164 | B2* | 10/2010 | Wood et al. | 704/5 |
| 8,239,762 | B2* | 8/2012 | Burstein et al. | 715/264 |
| 2004/0067472 | A1* | 4/2004 | Polanyi et al. | 434/178 |
| 2008/0059145 | A1* | 3/2008 | Wood et al. | 704/2 |

OTHER PUBLICATIONS

Otto, Wayne, and Bernie Hayes. "Glossing for Improved Comprehension: Progress and Prospect." (1981).*

* cited by examiner

*Primary Examiner* — Vincent P Harper
(74) *Attorney, Agent, or Firm* — Oliff PLC

(57) ABSTRACT

A method and system of generating personalized annotated text of a core-text, the method and system directed for acquiring a personal data comprising data indicative of the reader's proficiency level for understanding text; and providing at least a gloss to accompany the requested text based on core-text and the reader's proficiency level.

20 Claims, 5 Drawing Sheets

PERSONAL TEXT ASSISTANT

RELATED APPLICATIONS

The present application claims the benefit under 35 U.S.C. 119(e) of U.S. Provisional Application 60/890,506 filed Feb. 19, 2007, the disclosure of which is incorporated herein by reference.

FIELD OF THE INVENTION

Embodiments of the invention relate to aids for understanding textual material.

BACKGROUND OF THE INVENTION

Today's fast paced global world presents us with textual material that relates to a wide variety of subject matter from different places in the world and often in different languages that can substantially stress our ability to understand the textual material. Also, the global inventory of textual material is expanding at a rate at which the knowledge revolution is incrementing the global storehouse of information. The breathtaking speed at which knowledge is accruing not only has a tendency to overwhelm people, but it can cause a person's personal proficiency in understanding textual material relatively rapidly to become obsolete. People of all ages, from childhood to maturity, and in all walks of life, are challenged to continuously learn and update their personal inventory of knowledge and their ability to process textual material in which the knowledge revolution packages its data.

SUMMARY OF THE INVENTION

According to one aspect of the invention there is provided a method of automatic generation of personalized annotated text of a core-text, the method comprising:
  a. acquiring profile data in respect of a user;
  b. utilizing a processor for processing the data and determining a personal profile of the user, and storing the personal profile in a data storage; the personal profile being indicative of a proficiency level of the user in respect of the text;
  c. generating a personalized annotated text of the core text based on at least the personal profile of the user; the annotated text including at least a gloss of at least a part of the core text; and
  d. displaying the annotated text.

According to another aspect of the invention there is provided a system for automatic generation of personalized annotated text of a core-text, the system comprising:
  a profile generating engine, being responsive to received profile data in respect of a user and configure to generate a personal profile of the user based on the profile data; the personal profile being indicative of a proficiency level of the user;
  a data storage configured for storing the personal profile of the user;
  an annotation engine configured to generate a personalized annotated text of the core text, based on at least the personal profile of the user, the annotated text including at least a gloss of at least part of the core text.

According to another aspect of the invention there is provided a system for automatic generation of personalized annotated text of a core-text, the system comprising:
  a profile generating engine, being responsive to received profile data in respect of a user, wherein the profile data includes at least general data of the user and world data of the user, and configured to generate a personal profile of the user based on the profile data; the personal profile being indicative of a proficiency level of the user;
  a data storage configured for storing the personal profile of the user;
  an annotation engine configured to generate a personalized annotated text of the core text, based on at least the personal profile of the user, the annotated text including at least a gloss of at least part of the core text;
  a text analyzer configured for analyzing the core text, determining important textual elements and adapting the gloss to comprise of only important textual elements which are unknown to the user; and
  a computer display for displaying the annotated text.

According to another aspect of the invention there is provided a program storage device readable by machine, tangibly embodying a program of instructions executable by the machine to perform method steps of automatic generation of personalized annotated text of a core-text, the method comprising:
  a. acquiring profile data in respect of a user;
  b. utilizing a processor for processing the data and determining a personal profile of the user, and storing the personal profile in a data storage; the personal profile being indicative of a proficiency level of the user in respect of the text;
  c. generating a personalized annotated text of the core text based on at least the personal profile of the user; the annotated text including at least a gloss of at least a part of the core text;
  d. displaying the annotated text.

According to another aspect of the invention there is provided a computer program product comprising a computer useable medium having computer readable program code embodied therein of automatic generation of personalized annotated text of a core-text, the computer program product comprising:
  computer readable program code for causing the computer to acquire profile data in respect of a user;
  computer readable program code for causing the computer to utilize a processor for processing the data and determining a personal profile of the user, and storing the personal profile in a data storage; the personal profile being indicative of a proficiency level of the user in respect of the text; computer readable program code for causing the computer to generate a personalized annotated text of the core text based on at least the personal profile of the user; the annotated text including at least a gloss of at least a part of the core text;
  computer readable program code for causing the computer to display the annotated text.

An aspect of some embodiments of the invention relates to providing a gloss to accompany textual material and thereby to providing an annotated text that is configured to aid a reader of the material in understanding and using the text. The gloss is produced responsive to attributes of the text and a database that defines a personal profile of the reader's proficiency for understanding text. Hereinafter, a text for which a gloss is prepared is referred to as a "core text". An annotated text refers to the combination of a core text and an associated gloss. The word "gloss" is used to refer to a single gloss and to a "glossary" comprising a plurality of glosses.

In accordance with an embodiment of the invention, the gloss comprises material for aiding reader comprehension that may be drawn from any suitable available resource, such as by way of example, dictionaries, translations, encyclopedias, maps, Baedekers, movies and/or musical scores, and may comprise not only text but also images and/or playable audio material. In some embodiments of the invention, the gloss is provided in margins of pages comprising a core text.

Optionally, gloss material is interleaved with the core text. In some embodiments of the invention, a gloss is provided as a text separate from the core text for which it provides material.

The annotated text may be presented to a reader in any form suitable for the reader's use. For example, the annotated text may be presented in printed form or for display and optional manipulation on a video screen coupled to any suitable controller, processor and/or computer. In some embodiments of the invention, portions of core text corresponding to material in the gloss of an annotated text are highlighted or otherwise marked so that the reader is aware that the gloss comprises material relevant to the highlighted text. Optionally, gloss material for a marked portion of core text of an annotated text presented to the reader on a video screen, for example of a computer, does not appear on the reader's screen unless the reader clicks on, or otherwise singles out, the marked text. In some embodiments of the invention, information in a gloss may also be presented subliminally, below a threshold of reader consciousness. For example, in a computer video presentation of an annotated text, reading comprehension aids, such as definitions, may repeatedly be flashed for periods sufficiently short so that they are not consciously recognized but are subconsciously internalized.

According to an aspect of some embodiments of the invention, the gloss is configured to serve as a pedagogic tool for improving the reader's proficiency in understanding textual material. For example, a gloss configured for a particular core text may comprise a test that requires the reader to remember and/or use material, such as definitions of words, explanations of idiomatic constructions, and/or facts provided by the gloss. A gloss may be configured to teach a reader a foreign language by translating words and phrases in the text to the foreign language and optionally providing quizzes to test and enhance the reader's retention and/or use of the words.

An aspect of some embodiments of the invention, relates to providing a personal profile of a reader that comprises a measure of at least one skill and/or aptitude and/or data relevant thereto that characterizes the reader's proficiency in understanding textual material.

The at least one skill and/or aptitude and/or data relevant thereto comprises at least one of the reader's vocabulary size in a language; syntax understanding in a language; reading speed; subject matter familiarity profile; subject matter interest profile; and/or number and identity of languages that the reader uses.

According to an aspect of some embodiments of the invention, the personal profile provides a measure of at least one skill and/or aptitude and/or data relevant thereto characteristic of the reader's capacity for improving his or her proficiency for understanding text, for example, new language acquisition rate and/or new language retention rate.

In some embodiments of the invention, data for providing a reader's personal profile comprises data acquired actively. Data, hereinafter "active data", acquired actively, is data that is acquired responsive to a stimulus, such as a questionnaire or test, specifically designed to elicit response from the reader that provides the data. In some embodiments of the invention, acquisition of data for providing a reader profile comprises data acquired passively. Data, hereinafter "passive data", acquired passively is data that is not acquired actively, i.e. data that is not in response to stimuli specifically designed for eliciting the data. Passive data comprises data that may be acquired by monitoring a reader's behavior when using and responding to textual material. By way of example, passive data may be the reader's reading speed acquired by recording how long it takes the reader to read a given length of text, the readers interest profile acquired by noting relative frequencies of different types of text the reader chooses to read. Passive data may be data relevant to measuring the reader's retention of subject matter presented textually, such as how often the reader references different or same parts of a text.

An aspect of some embodiments of the invention, relates to providing a computer readable storage medium, a memory device, containing an instruction set for a computer responsive to which the computer may be configured to generate a gloss in accordance with an embodiment of the invention. The instruction set comprises instructions for manipulating a reader's personal proficiency profile responsive to textual material comprised in a core text to provide a gloss for the core text and thereby an annotated text. Optionally, the personal proficiency profile is not stored in the computer but is input to the computer as needed from a suitable memory device. The computer generates a gloss for a given core text and a corresponding annotated text responsive to the profile when the reader generates an appropriate input to the computer indicating the core text and his or her desire to have the core text accompanied by a gloss. Optionally, the given core text configured with the gloss, the annotated text, may be ordered in a suitable format requested by the reader from a supplier via the Internet. The annotated text may for example, be an annotated online book or article or a printed book or article. Optionally, the annotated text is printable by a printer connected to the computer.

In some embodiments of the invention, the instruction set comprises instructions for generating, maintaining and updating a reader's personal proficiency profile and optionally for generating a suitable computer interface for communicating and interacting with the reader to perform proficiency profile tasks.

An aspect of some embodiments of the invention, relates to providing a signal set encoded with an instruction set for a computer responsive to which the computer may be configured to generate an annotated text in accordance with an embodiment of the invention. Optionally, the signal set is encoded with instructions for generating, maintaining and updating a reader's personal proficiency profile and optionally for generating a suitable computer interface for communicating and interacting with the reader to perform proficiency profile tasks.

There is therefore provided in accordance with an embodiment of the invention, a method of interfacing a requested text with a reader, the method comprising: acquiring a personal database comprising data indicative of the reader's proficiency level for understanding text; and providing a gloss to accompany the requested text responsive to the requested text and the reader's proficiency level data.

Optionally, the proficiency level data comprises a measure of language proficiency for understanding a language in which the requested text is written. Optionally, the measure of language proficiency comprises a measure of a size of the reader's vocabulary. Additionally or alternatively, the measure of language proficiency comprises a measure of frequency of occurrence of words in the language that the reader recognizes.

In some embodiments of the invention, the measure of language proficiency comprises a measure of frequency of occurrence of multi-word expressions (MWEs) in the language that the reader recognizes. Optionally, the method comprises generating a frequency list of MWEs for use in providing the measure of frequency of recognized MWEs, using a classifier to locate MWEs in at least one text in the language.

In some embodiments of the invention, the measure of language proficiency comprises a measure of syntactical proficiency. In some embodiments of the invention, the reader's proficiency level data comprises a measure of reader familiarity with the contents of the requested text.

In some embodiments of the invention, providing the gloss comprises determining whether an instance of a textual component in the requested text warrants an explanation, and if so providing the explanation in the gloss. Optionally, the method comprises determining if the instance of the textual component warrants explanation responsive to a measure of importance of the textual component in the requested text. Optionally, the method comprises determining the measure of importance responsive to frequency of occurrence of the textual component in the requested text. Additionally or alternatively, the method comprises determining the measure of importance responsive to frequency of occurrence of the textual component in a text other than the requested text.

In some embodiments of the invention, providing the gloss comprises cuing the reader to the importance of the textual component. In some embodiments of the invention, the method comprises determining if the instance of the textual component warrants explanation responsive to a location of the instance in the text. Optionally, location comprises location relative to other instances of the textual component in the text.

In some embodiments of the invention, the method comprises providing learning aids for upgrading the reader's proficiency level data responsive to the textual component.

In some embodiments of the invention, the textual component is a word. In some embodiments of the invention, the textual component is a grammatical construction.

In some embodiments of the invention, providing the gloss comprises determining whether content of the text warrants enrichment information, and if so, providing such enrichment information. Optionally, the method comprises providing learning aids for upgrading the reader's proficiency level data responsive to the content.

In some embodiments of the invention, acquiring the database comprises querying the reader. Optionally, querying the reader comprises testing the reader.

In some embodiments of the invention, the method comprises providing a reader interface that enables reader input to the gloss. Optionally, reader input comprises requests that the gloss provide specific information. Additionally or alternatively, acquiring a database comprises generating data responsive to reader input and incorporating the data in the database.

In some embodiments of the invention, the method comprises updating the database.

BRIEF DESCRIPTION OF THE FIGURES

Examples illustrative of embodiments of the invention are described below with reference to figures attached hereto by way of non-limiting example only. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

DETAILED DESCRIPTION OF EXEMPLARY EMBODIMENTS

As used herein, the phrase "for example," "such as" and variants thereof describing exemplary implementations of the present invention are exemplary in nature and not limiting. Reference in the specification to "one embodiment", "an embodiment", "some embodiments", "another embodiment", "other embodiments", "certain embodiment" or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments" or variations thereof do not necessarily refer to the same embodiment(s). It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited.

In addition, embodiments of the present invention are not described with reference to any particular programming language. It will be appreciated that a variety of programming languages may be used to implement the teachings of the inventions as described herein.

Unless defined otherwise, all technical and scientific terms used herein have the same meaning as commonly understood by one of ordinary skill in the art to which this invention belongs. Generally (although not necessarily), the nomenclature used herein described below are well known and commonly employed in the art. Unless described otherwise, conventional methods are used, such as those provided in the art and various general references. Unless specifically stated otherwise, as apparent from the following discussions, it is appreciated that throughout the specification discussions, utilizing terms such as, "providing", "applying "generating", "processing", "taking", "selecting", "receiving", tanalyzing", "evaluating", "performing", "executing" or the like, refer to the action and/or processes of any combination of software, hardware and/or firmware.

Figure 1:
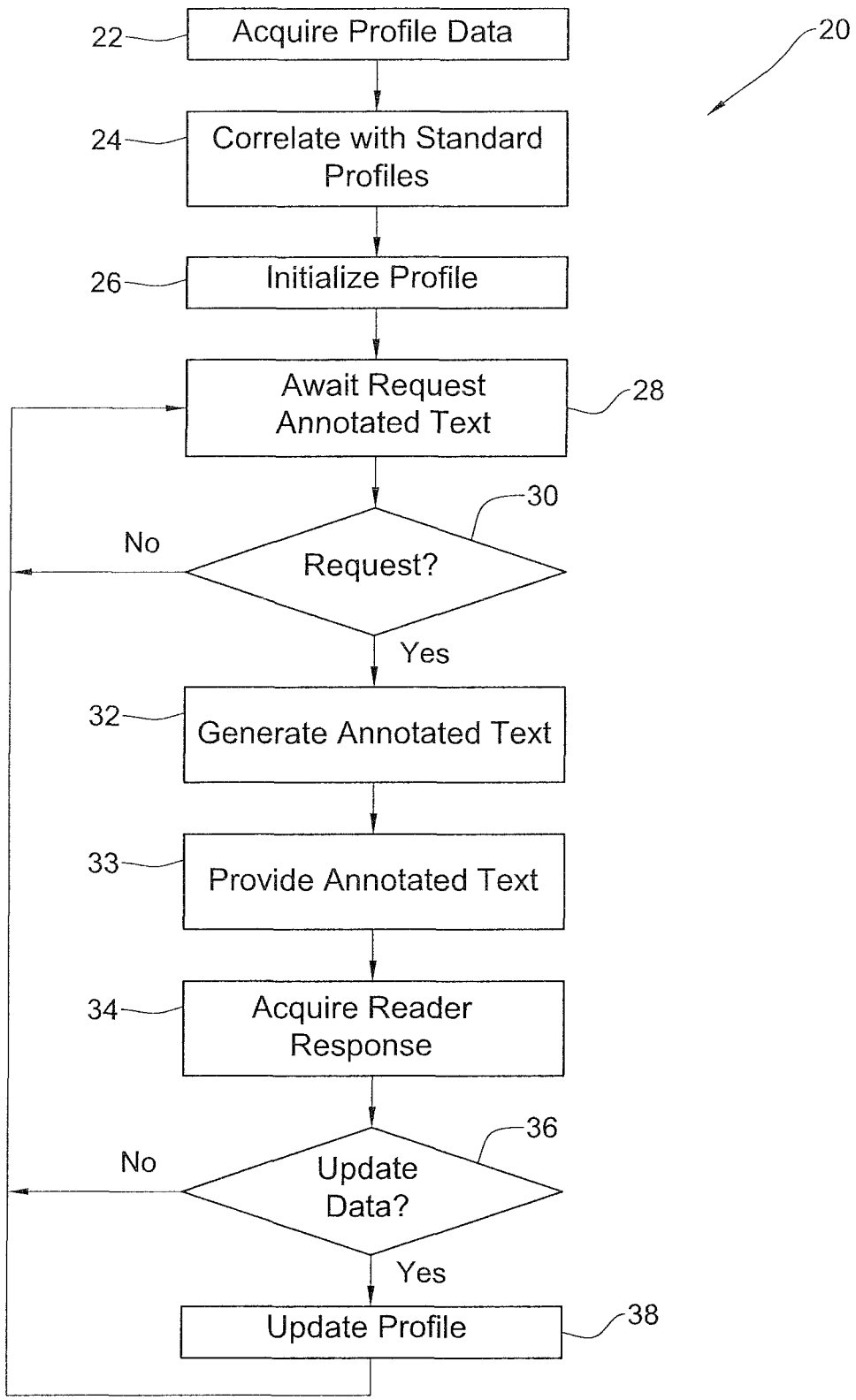
FIG. 1 shows a flow diagram that illustrates generating a personalized annotated text, in accordance with an embodiment of the invention.

FIG. 1 shows a flow diagram that illustrates a method 20 of generating an annotated text for a reader, in accordance with an embodiment of the invention. It is assumed that at least one computer is employed to implement the method. For convenience of presentation, method 20 for providing a personally annotated text is referred to as "personally annotated publishing" (PAP) and PAP is used to refer to the method and/or a system employing the method.

It is assumed that the reader is a first time user of PAP and in block 22, PAP, i.e. the at least one computer programmed to implement PAP and/or programs that program the at least one computer, acquires initial data to generate an initial "startup" personal profile of the reader's proficiency for understanding textual material. The data acquired by PAP is generally active data that the PAP acquires by presenting suitable questionnaires, tests and/or forms to the reader. Optionally the active data acquired comprises conventional personal data such as age, sex, address, educational background. Personal data might also comprise health data, for example visual acuity, and information as to any cognitive and/or physical handicaps that the reader may have.

In addition, the active data optionally comprises "proficiency data", of particular relevance to the assessment of reader proficiency. Proficiency data optionally comprises identity of the reader's mother tongue and other languages that the reader uses and optionally a reader self-assessment of his or her proficiency in each of the languages. For example, the reader may be requested to rank proficiency in his or her written and spoken mother tongue and that of other languages that the reader uses and provide specific indications as to size of active and passive vocabularies in at least one of the languages. In some embodiments of the invention, the reader may be asked to take at least one test to acquire active proficiency data. For example, the reader may be asked to take a reading comprehension test and/or vocabulary test in at least one language. Optionally, the at least one test comprises a test to determine how fast the reader reads and/or reader latency in properly associating correlated textual information. In some embodiments of the invention, a frequency list of words for at least one language is used to provide a measure of a reader's proficiency in the language. A frequency list of words in a language ranks each word in the list by a frequency of its occurrence in the language. The reader is optionally asked to indicate words in the list that the reader knows and optionally which words in the list that the reader does not know. In some embodiments of the invention, the reader is tested to determine which words the reader knows and/or doesn't know by challenging the reader for a response to a suitable stimulus and monitoring the response. To an extent that the reader knows words that are associated with smaller frequencies of occurrence, the reader's proficiency in the language is assumed to be better. Different types of word frequency lists may be used to assess reader proficiency. For example, a frequency list may be restricted to words in a given field of knowledge, such as, medicine, aeronautics, law or archeology. Optionally, the field of knowledge is determined by the reader and/or a text that is to be annotated.

Optionally, a plurality of different frequency lists is used to test a reader's language proficiency and correlations between test results obtained with the different tests are used to determine reader proficiency. For example, if the reader is tested with two frequency lists, and does not indicate knowledge of a same word that appears in both lists, optionally, PAP determines that the reader does not know the word. Optionally, test results from a plurality of frequency lists are weighted in determining reader proficiency. In some embodiments of the invention, a test used to acquire proficiency data is configured as a computer game that the reader plays and the reader's performance at playing the game provides proficiency data. For example, the reader's ability to respond to textual as well as audio and visual cues during play of the game might be used to provide proficiency data. In some embodiments of the invention, a reader is tested to determine a level of familiarity with multi-word expressions (MWEs). A multi-word expression, an MWE, is a set of words that commonly occur together as a sequence to express an idea, concept or object. The sequence generally expresses the idea, concept or object more clearly and/or more satisfyingly than a single word. The sequence generally corresponds to a "non-compositional sequence", for which a reader cannot infer a meaning from the meanings of the individual words in the sequence. MWEs are relatively frequent linguistic phenomena and include phrased verbs such as "add-up" and "run into" nominal compounds such as "telephone-box" and fixed idioms and colloquial expressions such as "kick the bucket" or "son of a gun".

Testing for reader understanding of MWEs is optionally done similarly to a way in which word proficiency is tested by using an MWE frequency list in which MWEs are correlated with frequency of their occurrence. Reader proficiency is assessed as better, as recognized MWEs have lower associated frequencies.

In an embodiment of the invention, a frequency list of MWEs is generated by analyzing a text to locate MWEs therein and correlating the located MWEs with frequencies of their respective occurrences in the text. Optionally MWEs are located using an "MWE spotting" algorithm in accordance with an embodiment of the invention. In the MWE spotting algorithm, a text is searched for an MWE by searching the text for a string of letters that represents the MWE. Additionally, for a given MWE, the text is optionally searched for at least one "inflected version" of the MWE in which a word is inflected differently from its form in the given MWE. Optionally, the at least one inflected version comprises a version in which a verb in the given MWE is inflected differently. For example, if the given MWE is "ran into" the text is also optionally searched for its inflected versions "run into" and/or "running into". Optionally, the at least one inflected version comprises all the various inflections of the verb. In some embodiments of the invention, a text is searched for versions of a given MWE in which words in the MWE are separated by non-MWE words and/or the text is searched for MWE versions that are not in standard form. For example, a text might be searched to locate occurrences of a non-standard form of the MWE "kick the bucket", in which the non-standard form is "kick the bloody bucket". Optionally, the MWE spotting algorithm uses at least one classifier trained to identify a given MWE and versions thereof to locate occurrences of the MWE and its various versions in a text.

In an embodiment of the invention, the initial data comprises "interest profile" data, such as data identifying countries the reader has visited, subject matter the reader is interested in, and in what material the reader is interested in increasing his or her knowledge. The reader may also indicate a personal need for remedial tutoring to improve a deficiency, such as poor vocabulary, reading comprehension that he or she feels exists. As in acquiring proficiency data, game play may be used to assess reader interest patterns.

In an embodiment of the invention, PAP comprises a database of standard reader proficiency profiles. The standard profiles are optionally a set of "discrete" profiles, each profile defined by a different set of representative values for data used by PAP for assessing reader proficiency. Optionally, in a block 24 PAP correlates the initial profile data it acquires in block 22 for the reader with the standard profiles to determine which standard profile best fits the initial profile data. For example, PAP optionally uses a suitable classifier to determine to which standard profile the initial profile data belongs. In a block 26, PAP sets an initial personal profile for the reader to be a standard profile to which PAP determines the initial data belongs.

In a block 28, PAP waits to receive a reader request for a gloss and annotated text for a core text and a format in which the reader prefers to receive the annotated text, in accordance with an embodiment of the invention. Optionally, the reader requests a core text from a library of core texts comprised in PAP. In some embodiments of the invention, the reader can provide PAP with a core text for which the reader would like a gloss and an annotated text. The core text may be provided by transmitting or inputting a copy of the core text to PAP using any suitable storage medium. For example, the core text may be uploaded to PAP over the Internet and/or transmitted to PAP from a computer readable storage medium, such as by way of example a CD, floppy disc or flash memory. Optionally, the core text is transmitted to PAP from a computer library that is not comprised in PAP. Optionally, the text is a printed text, which is scanned into a computer that provides PAP with the scanned copy.

Optionally, a reader request for an annotated text of a given core text may include reader preferences that specify features and/or characteristics of the gloss comprised in the annotated text. For example, the reader request may specify to include or not to include pedagogical and/or remedial aids and/or to suspend providing images for map references. If the annotated text is to be presented on a computer video screen, the reader may request that audio data, playable by the computer, be included in the gloss. He or she may also request suspension of subliminal presentation of information in the gloss.

In a decision block 30, PAP determines if such a request has been received. If no request is received, PAP returns to await a request in block 28. If, on the other hand, a request to annotate a given text is received, PAP proceeds to a block 32, creates a gloss for annotating the requested core text, and configures the core text with the gloss to generate the annotated text.

PAP generates the gloss in block 32 responsive to the reader profile established in block 26, reader preferences for the gloss and to the requested core text for which the reader desired the gloss. In an embodiment of the invention, PAP uses the profile, for example characteristics of the reader's vocabulary comprised in the profile, as an indication of which words in the requested core text should be defined in the gloss. If a word is expected to be outside a vocabulary envelope of the reader, it is optionally indicated as a candidate for translation. Optionally, in determining if a candidate word should be translated, PAP assesses importance of the candidate word. Any measure of word importance known in the art may be used to determine word importance, in accordance with an embodiment of the invention. Importance may be determined at least in part by frequency with which a candidate word appears in the requested core text. Additionally or alternatively, importance may be determined, at least in part, responsive to a criterion independent of the core text. For example, a "component" of importance of a given candidate word may be determined responsive to importance of the candidate word in a language in which the core text is requested, or importance in a particular discipline, art and/or field of knowledge. Word importance might be measured by frequency of occurrence of the word in world literature as determined from Internet resources or by cognates the word has. In some embodiments of the invention, the reader may indicate that frequency criteria used to determine word importance should be relaxed or made more stringent. For example, if the reader feels that he or she needs remedial support for the language of the core text, the reader may indicate that criteria for word importance should be relaxed.

In accordance with an embodiment of the invention, the gloss provided by PAP does not provide a translation for every occurrence in the requested core text of a word for which PAP decides a translation can be advantageous. Optionally, the word may be translated as a function of its location in the core text. For example, frequency of translation may be relatively high for early portions of the core text and decrease for later portions. Optionally, translations are presented subliminally if the reader specified subliminal presentation.

Various other criteria may be used to determine if, when and how to provide gloss material for a word. For example, if a word is determined to be outside the reader's vocabulary envelope, PAP might determine not to provide it with gloss material if the word has a cognate that appears frequently in a language well known to the reader that is different from the core text language. Determining whether or not to provide gloss material may optionally depend on a "personal relationship" of the word with the reader. The word may not be glossed, even if outside the reader envelope, if the word has appeared with high frequency in previous glosses provided to the reader and the reader has not requested gloss material for the word, or an abundance of gloss material has previously been provided for the word. In some embodiments of the invention, a gloss may be provided for a word determined to be within the reader's envelope if the word has false cognates, (similar sounding words having dissimilar meanings) in languages other than the core text language. In accordance with an embodiment of the invention, if the reader opted for remedial material, the gloss may include exercises, games and/or tests for aiding and testing the reader's learning of words for which the gloss provides translations. For example, a gloss in accordance with an embodiment of the invention may provide visual cues to the importance of a word in the core text and or in a language that the reader is reading. A visual cue optionally comprises a straight line, a "frequency ruler", in which a full length of the line represents a full length of the core text and witness lines along the line indicate occurrence of the word at different locations in the text. A frequency ruler for a word, which appears infrequently or frequently, would be sparsely or densely populated respectively with witness lines and indicate to the reader relative importance of the word and possibly how much attention the word warrants.

Whereas the discussion above refers to word vocabulary, practice of the invention is not limited to providing explanatory material for words but optionally provides explanatory, pedagogical and/or remedial material for any type of content comprised in a requested core text. For example, PAP optionally defines a phrase envelope and/or syntax envelope for the reader and provides explanations and definitions for phrases and/or syntactical constructions in the requested core text that lie outside the envelope or envelopes.

By way of another example, a PAP gloss may provide images such as maps, pictures and/or diagrams to elucidate geographical, artistic and/or technical references in a core text. In some embodiments of the invention, a PAP gloss in an annotated text may comprise playable audio material. If the annotated text is presented on a computer screen, the audio material may be played by clicking on an icon representing the audio material with a mouse and/or by suitable operation of a keyboard or an audio interface with the computer. If the annotated text is a printed text, the audio material may be encoded in a computer readable printed format, such as by way of example a bar code, which can be input to a computer for playing using a suitable optical reader.

Figure 2:
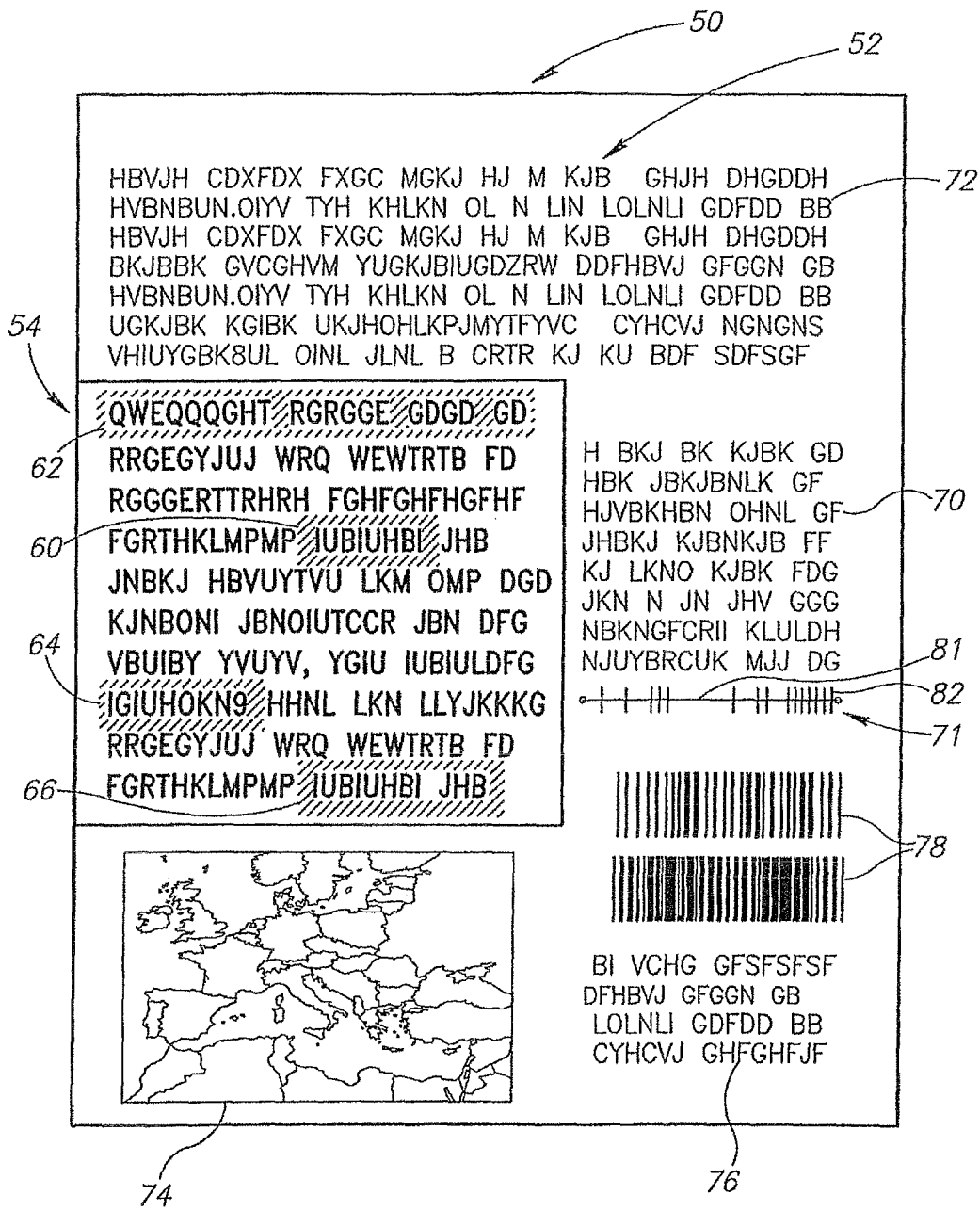
FIG. 2 schematically shows a page of an annotated text, in accordance with an embodiment of the invention.

By way of example, FIG. 2 schematically shows an annotated text 50 comprising a gloss 52 corresponding to a core text portion 54, in accordance with an embodiment of the invention. By way of example, gloss 52 is shown surrounding core text 54 and may be presented differently from the way it is shown in FIG. 2. Gloss material may be interleaved with core text material or be hidden until called out by highlighting a suitable icon on a computer screen or keying in a request on a keyboard. Features of text 54 that are associated with material in gloss 52 are very schematically represented by random letter words and phrases shown shaded and include a word 60, a phrase 62 a geographical reference 64 and a musical reference 66.

Gloss 52 comprises by way of example, a dictionary definition 70 of word 60 and a frequency ruler 71 for the word, an explanation 72 of phrase 62 and a map 74 indicating location of geographical reference 64. Frequency ruler 71 comprises a ruler line 81 whose length schematically represents a full length of a core text that comprises core text portion 54 and witness lines 82 that indicate where in the core text the word 60 appears. From the distribution of witness lines 82 along ruler 81 it is seen that word 60 appears most frequently towards the end of the core text. Gloss 52 also comprises a bar code 76 encoded with music associated with musical reference 66, which when scanned by a suitable optical reader connected to a computer (not shown) causes the computer to play a piece of music. In addition, the gloss optionally comprises a mnemonic multiple-choice test 78 that tests a reader's retention of a definition of a word provided by the gloss on a different page of the text.

Reverting to FIG. 1, in a block 33 PAP provides the reader with the annotated text generated in block 32 in any suitable format preferred by the reader. Optionally, the provided annotated text is a downloadable text that may be downloaded and read on a video display, such as for example, a video display of a computer, PDA, mobile phone TV or gamer. Optionally, the text is a printed text that is delivered to the reader by mail or any suitable delivery service.

As noted above, a core text and its gloss material, such as text 50 and it gloss material 52, may be presented differently form the way it is presented in FIG. 2. In some embodiments of the invention, a reader is able to provide a constraint for configuring presentation of a core text and associated gloss. For example, a reader can determine line spacing, font size and type and fill factors for determining maximum amounts of space on a presentation page to be filled by core text and gloss. Optionally PAP comprises a library of presentation formats for special purposes such as formats configured for providing annotated texts adapted to compensate for handicaps readers might have. For example, an annotated text in accordance with an embodiment of the invention may be provided in a relatively large font for sight challenged individuals, or in Braille or as a playable audio file.

In a block 34, following and/or during use of the annotated text provided by PAP in block 33 PAP acquires reader response data to the annotated text that is useable to update the reader's proficiency profile. Optionally, PAP acquires response data to the annotated text by actively querying and/or testing the reader, for example by requesting the reader to rank at least one of the features and/or characteristics of the annotated text. For example, a questionnaire may ask if the gloss provided too much material already known to the reader or if too much material in the core text that is not known to the reader was not provided with gloss material. Performance of the reader on tests and/or games comprised in the gloss or provided extrinsic to the gloss and configured, for example to test reader comprehension, retention of pedagogical gloss material and/or familiarity with a given subject may be recorded to provide reader profile update data.

Optionally, reader response data is acquired passively from observation of reader interaction with the annotated text if the text is read from a computer video screen. For example, the reader's reading speed may be obtained by timing how long it takes the reader to read a given portion of text. Reader retention may be measured by observing how many times the reader refers back to preceding references in the gloss.

In some embodiments of the invention, PAP uses any of various eye motion tracking technologies known in the art to track eye motion of a reader to acquire reader response data.

For example, by tracking eye motion, PAP may determine how frequently the reader accesses the gloss and which portions of the gloss the reader accesses most frequently. PAP may use the eye tracking data to determine which word definitions were used more frequently than others and thereby provide data for updating the user's vocabulary envelope. The eye tracking data may also be used to provide a measure of reader retention for gloss material by providing an indication as to how frequently the reader refers to same material in the gloss. Retention data can be used to update a measure of the ability of the reader to internalize new information. Eye tracking may be used to provide a measure of the reader's ability to associate correlated textual and/or visual information in the annotated text and thereby data for updating a measure of the reader's ability in general to associate information.

In a decision block 36, PAP determines if the reader response data warrants updating the reader's proficiency profile. If not, PAP returns to block 28 to await the reader's request for another annotated text. If, on the other hand, the data warrants updating the reader profile, PAP proceeds to a block 38, updates the profile, and then proceeds to block 28. In the description and claims of the application, each of the words "comprise" "include" and "have", and forms thereof, are not necessarily limited to members in a list with which the words may be associated.

Figure 3:
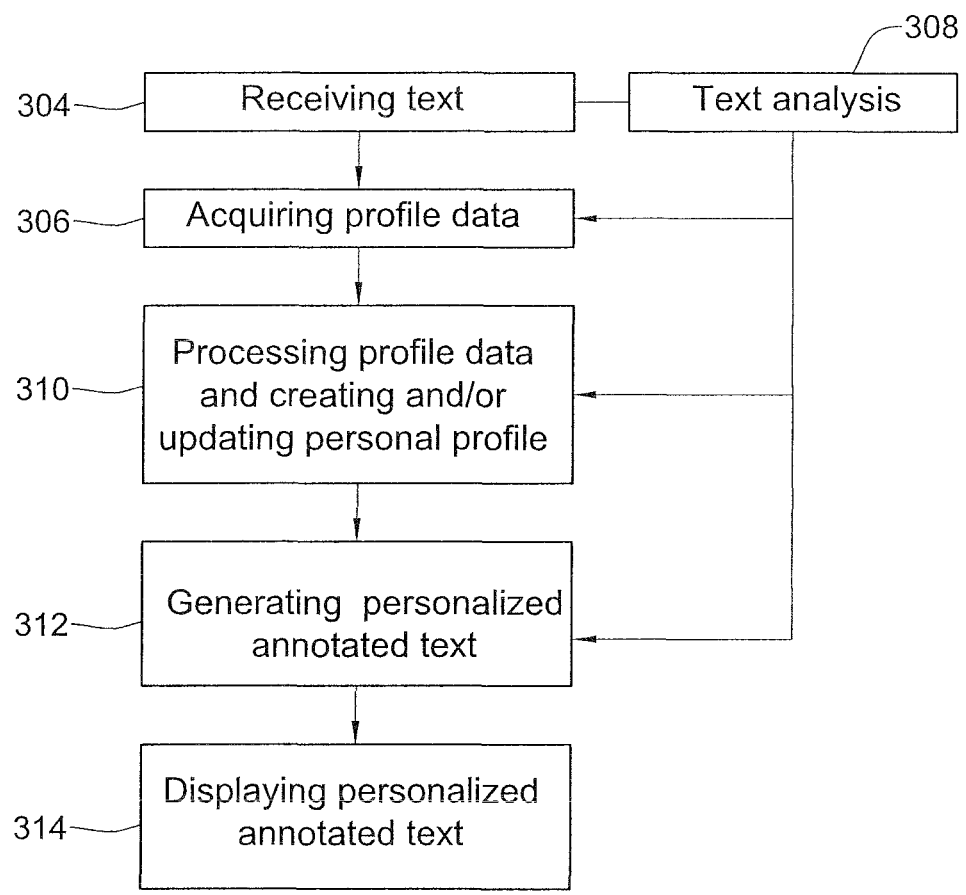
FIG. 3 shows a flow diagram that illustrates generating a personalized annotated text, in accordance with an embodiment of the invention.

FIG. 3 shows a flow diagram that illustrates the operations for generating a personalized annotated text (otherwise referred to as PAP), in accordance with an embodiment of the invention. In other embodiments, there may be more, less and/or different stages than illustrated in FIG. 3, and/or stages illustrated as being sequential may be performed in parallel. Typically during the initial stage of the process, a user wishes to read or access any textual content. The user selects and/or or uploads a core-text which he or she wishes to process 304. As noted above, core-text is a text which is processed and automatically annotated according to embodiments of the invention. As described above with reference to FIG. 1 core-text may be acquired by any suitable communication and/or inputting means. According to some embodiments, a user may commence the process depicted in FIG. 3 without initially providing a core-text and the core-text may be uploaded during later stages of the process.

In the next stage 306 profile data of the current user is acquired. According to certain embodiments, profile data is acquired and used for constructing a personal profile of the user, which defines the user's proficiency for understanding text. According to certain embodiments, profile data may be divided into two main types of information. The first type of information comprises general personal data (referred earlier as "conventional personal data") and personal information in respect of the knowledge of the user (referred earlier as "proficiency data"). The first type of information is typically acquired by presenting a suitable questionnaire inquiring about the personal information of the user and recording the user's answers. As mentioned above, with reference to FIG. 1, in some embodiments, general data may be obtained by asking the user to take at least one test. For example, in order to determine the proficiency level of the user in a certain language, the user may be asked to take a comprehension or a vocabulary test. The first type information is assembled, processed and utilized to construct the "general profile" of the user. In the following discussion the term "general data" refers to the first type of information.

The second type of information comprises information regarding the knowledge and comprehension of the user with regard to specific textual element. It should be noted that the term "textual element" as used herein refers to a word, a group of words, a phrase, multi-word expression, or any other meaningful expression. According to certain embodiments, the second type of information is acquired by initiating a variety of tests and challenges to the user which are directed for evaluating the proficiently level of the user in respect of one or more textual elements. The second type of information is assembled and utilized to construct a "word profile" of the user. In the following discussion the term "word data" refers to the second type of information.

According to certain embodiments, where a core-text is available, the core-text is analyzed 310. The analysis of the core-text provides information which assists in the construction of both the general profile and the word profile. During the analysis, different characteristics of the core-text are determined, for example: the subject of the core-text, whether it is the first time the user is reading this core-text, the general proficiency level of the user in respect of the language in the core-text, etc. This information is assembled and stored and used in the following step, for the construction and updating of the general profile. Other information is extracted from the core-text and utilized for obtaining word data and for constructing the word profile in the next stage of the process. For example, as mentioned above with reference to FIG. 1, during the analysis of the core-text, important textual expressions (e.g. words) within the core-text are identified. Method of determining importance of textual expressions may includes any method known in the art e.g. tf-idf (term frequency-inverse document frequency). According to a certain embodiment, tests for testing the knowledge of the user are automatically generated such that they are directed for testing the knowledge of the user specifically in respect of important words within the core-text.

The following are a number of non-limiting examples of tests and other tools that may be employed in order to assess the proficiency of a user in respect of one or more textual elements.

According to certain embodiments, different questions directed for testing the vocabulary of the user may be used. A question may be randomly selected from a pool of questions. Alternatively or additionally, questions may be centered on textual elements which are either known or unknown to other users with similar personal profiles. Tests may be constructed to include questions on textual elements which were unknown to the current user in the past, according to previous tests results. Tests may be constructed to specifically omit questions on textual elements which are known to the current user according to previous test results. Tests may be constructed with questions directed to specific subjects (e.g. subjects selected by the user or subjects automatically selected according to the user's fields of interest).

If the personal profile of the current user already exists, the level of difficulty of the tests may be adjusted according to the current proficiency level of the user, as represented by his or her personal profile. Alternatively or additionally, test difficulty may be adjusted according to the knowledge of other users having a similar general profile or/and word profile. Additional types of tests are described above with reference to FIG. 1.

In addition or instead of tests, games which are designed for testing the knowledge of a user may be used. For example, in case a personal profile of the current user already exists, a user may compete in word games against a computer or other users having similar personal profiles.

According to certain embodiments, the user's actions may be monitored and used to provide information with regard to the user's knowledge. For example, dictionary searches performed by the user may be monitored and facilitated to learn about the user's knowledge. Other user interactions which may also serve to learn about the user's knowledge in respect to specific textual elements are described above with reference to FIG. 1.

According to certain embodiments, each time the knowledge of the user in respect of a specific textual element is tested, a knowledge event occurs in respect of that textual element. In general each knowledge event may result in a positive or a negative result, where a positive result (e.g. a correct answer) indicates that the user knows the meaning of the textual element in question, and a negative result (e.g. an incorrect answer) indicates that the user does not know the meaning of the textual element in question.

Each textual element which was the subject of a knowledge event is recorded together with the relevant result. According to certain embodiments, textual elements are stored in a data storage, e.g. in a relational table format, wherein each record represents a textual element, the knowledge event which took place and the nature of the result of the knowledge event (e.g. whether it was a positive or a negative result).

In the next stage 310 the profile data is processed and a personal profile of the user is created. According to certain embodiments, where the current user already has a personal profile, the profile data is used for updating the existing personal profile. According to certain embodiments the personal profile is a combination of the general profile and the word profile.

According to certain embodiment, the general data is processed and utilized in order to construct a general profile. The processing of the general data may include creating a profile of the user based on the data which was obtained in the previous stage 306. For example the general profile may include the following fields: proficiency of the user in one or more language, educational background, areas of interest, mother tongue, social background, age, etc. According to certain embodiments, once the general profile is constructed the profile is compared with profiles of other users and is associated in a cluster of user-profiles having similar general profiles (i.e. clustering). Clustering is based on the assumption that people with similar characteristics (e.g. educational background, social background, age, fields of interest, etc.) are likely to have similar knowledge. Clustering is therefore facilitated by utilizing different statistical methods, in order to deduce from the knowledge of a plurality of users in a cluster about the knowledge of another user. Thus, for example, if there is no information regarding the knowledge of the current user in respect of a certain textual element, and the clustering shows that most users in the relevant cluster know that textual element, it is assumed that the current user also knows that specific textual element. Clustering may also be used, for example, in order to deduce general proficiency level of a language.

According to certain embodiments, the word data is processed and utilized in order to create a word profile. As explained above, each time the knowledge of the user in respect of a specific textual element is tested, a knowledge event occurs in respect of that textual element. Depending on the knowledge event and the action of the user (e.g. whether the action of the user produced a positive or a negative result) a knowledge event is scored, the score being indicative of the estimated knowledge of the user in respect of the textual element. For example, a first knowledge event may be a question in a test on the meaning of the word "tree". Assuming the user answered the question correctly the current score for the word "tree" is 10%. A second knowledge event is a question on the meaning of the word tree which arose during a word game which was played by the user. Again the user answered correctly and now the score for the word tree is 30%. The user is recorded searching for the definition of the word tree in an on-line dictionary (i.e. an additional knowledge event) and the score for the word tree is updated to 35%. According to certain embodiments, when a score of a word reaches a certain threshold (e.g. 100%) the user is assumed to know the word.

Each textual element which was the subject of a knowledge event is recorded together with its score. Each time a user is tested for his or her knowledge in respect of a specific textual element, the score of the textual element is updated according to the test results. According to certain embodiments, textual elements which are stored in a data storage, e.g. in a relational table format, also include the current score of the textual element. According to certain embodiments, the table represents the word profile which is a representation of the user's vocabulary (see also description above with regard to FIG. 1).

According to certain embodiments, clustering may also be implemented based on the word profile of the user. Users with similar word profiles are clustered together and the word knowledge of a plurality of users in the cluster is used in order to deduce information regarding the word knowledge of the current user. In a similar manner clustering may be based on the personal profile, using the combination of both the general profile and the word profile in order to compare between users, create clusters and deduce information.

Once the personal profile is created (or updated) personalized annotated text is generated based on at least the personal profile of the user 312. According to certain embodiments, based on the information gathered in the previous stages (currently represented by the personal profile) it is decided whether a certain textual element is within the knowledge of the user, and accordingly whether to present the relevant definition in the annotated text. According to certain embodiments, it is also determined how well the user knows a certain language (i.e. the proficiency level of the language), and accordingly the annotation is adapted to match the knowledge of the user. For example, words in English, which are assumed to be unknown to the user, are defined and annotated using terms and expressions which match the general proficiency level in English of the user. According to certain embodiments, the proficiency level of the language of the user is determined according to the word knowledge as manifested by the word profile and according to the general profile. For example, the proficiency level of English of a user can be determined based on the following combination of data: the vocabulary of the user as recorded in the word profile, the declared level of English as recorded in the general profile and the clustering results of the personal profile with personal profiles of other users.

According to certain embodiments, the decision whether to translate or define a certain textual expression is made based on the now available personal profile of the user. According to one embodiment, the decision is made based on the word profile of the user. According to another embodiment, the decision is made based on the general profile of the user, and according to yet another embodiment, the decision is made based on both the general and word profiles of the user (i.e. the personal profile).

As explained above, the word profile provides information regarding the knowledge of the user in respect of specific textual expressions and may also be used to learn in general about the vocabulary of the user. Textual expressions in the word profile are associated with a score which indicates the knowledge of the user in respect of each textual expression in the word profile. According to certain embodiments, the decision whether to provide the definition or translation of a certain textual expression is based, inter alia, on the score associated with that textual expression. If the score is below a predefined threshold it is assumed that the user does not know the meaning of the textual expression associated with the score and accordingly the definition of the word should be presented to the user.

In addition or instead of the previous parameter, word profile and general profile allows comparing between different users (i.e. clustering) and deducing about the word knowledge of one user from the word knowledge of other users with similar word profiles. Thus, if no indication is available with regard to the knowledge of a user in respect to a specific textual element, the decision of whether to present a definition (or translation) of the textual element in the annotated text may be based on clustering. As mentioned above, clustering may be also based on the personal profile.

According to certain embodiments, in addition to the personal profile the decision of whether to present the definition (or translation) of a textual element to the user is based on the information obtained from the text analysis of the core-text. In the event that no core-text was previously uploaded, at this stage a core-text must be available in order to be annotated 318.

As described above with reference to FIG. 1 text analysis includes, inter alia, identifying important textual expressions (e.g. words) in the core text. According to certain embodiments, as a rule, annotated text includes annotation of important textual expressions. However, according to certain embodiments, if the personal profile of a user indicates that a user knows the meaning of an important textual expression, the textual expression, although determined as important during the text analysis, will not be annotated.

According to certain embodiments, text analysis provides additional information such as the subject of the core text or whether this specific core-text has already been read by a certain user. Such information together with the personal profile may also contribute to making the decision as to whether to present the definition (or translation) of a textual element to a user. The following example illustrates the value of text analysis in making the above decision. A first user that, according to his general profile, has a PhD in psychology, and is reading a text related to computer science (e.g. as realized from text analysis), is assumed to have less word knowledge, compared to a second user who is reading the same text, but whose general profile indicates that his educational background includes a PhD in computer science. Therefore, according to the thus far provided information, the first user will be provided with annotation of simpler textual elements, compared to the second user. On the other hand, if the general profile of the first user indicates that one of his fields of interest is computer science, and that he has repeatedly read computer science related material, it may be assumed that his knowledge is similar to the second user, and therefore his or her annotation will be similar as well.

In the last stage the personal annotated text (PAP) is displayed to the user 314 e.g. on a computer screen. According to certain embodiments, in this stage the format for presenting the annotated text is determined. For example, the position of the annotated text in respect of the textual elements which is being defined or translated is determined (e.g. is the definition positioned on the left side, right side or bottom of the core-text).

Figure 4:
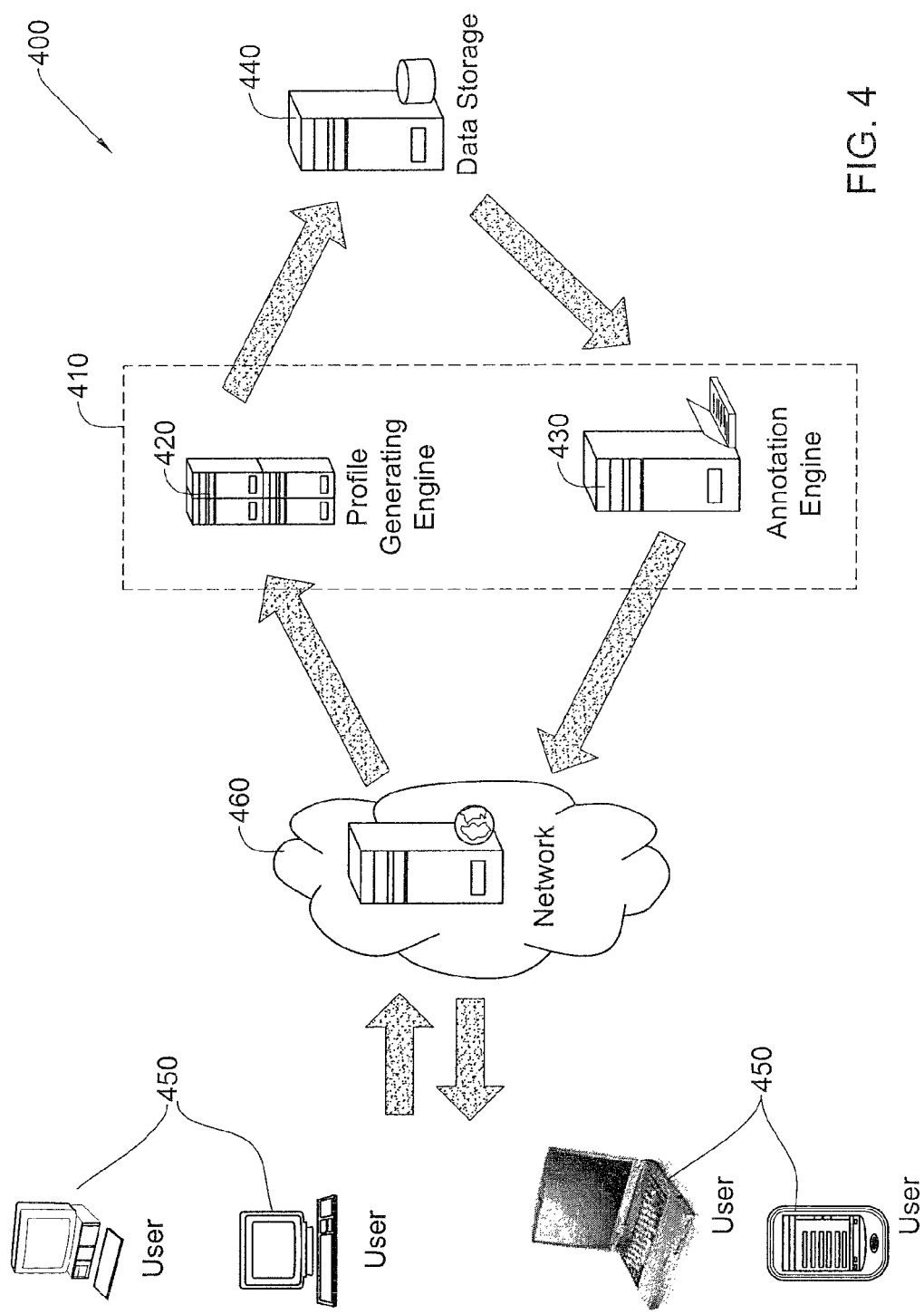
FIG. 4 is a high-level illustration of the system architecture, in accordance with an embodiment of the invention.

Attention is now drawn to FIG. 4, showing a high-level illustration of the architecture of a system 400, in accordance with an embodiment of the invention, for carrying out the above described method of automatic generation of personalized annotated text of a core-text. According to certain examples, system 410 (which represents a subsection of system 400 and comprise of the main processing units) includes a profile generating engine 420 and an annotation engine 430, and is associated with database maintained in appropriate data storage utility 440. The system may be configured in a single computer or otherwise distributed between multiple computers. The profile generating engine 420 is configured to be responsive to received profile data in respect of a user and to generate a personal profile of the user based on the received profile data. The personal profile is indicative of a proficiency level of the user, and is stored in the database. The annotation engine 430 is configured to generate a personalized annotated text of the core text, based on the personal profile of the user and possibly some additional data as described above. The annotated text generated by annotation engine 430 includes at least a gloss of a part of the core text or the entire core text.

System 410 is illustrated in the example of FIG. 4 in the context of a network 460. Network 460 may be any appropriate computer network for example: the Internet, a local area network (LAN), wide area network (WAN), metropolitan area network (MAN) or a combination thereof. The connection to the network may be realized through any suitable connection or communication utility. The connection may be implemented by hardwire or wireless communication means via a client-server communication session. As illustrated in FIG. 4, one or more clients 450, are connected via network 460 to system 410 In other embodiments, system 410 may be fully or partially accessed outside of a context of a network, for example with any of client(s) 450, being directly coupled to system 410, for example via a universal serial bus (USB) connection.

Clients 450 may be, but are not limited to, personal computers, portable computers, PDAs, cellular phones or the like. Each client 450 may include a user interface and possibly an application for sending and receiving web pages, such as a web browser application or web API, which may be utilized, for communicating with system 410.

According to certain embodiments, profile generating engine 420 is configured for receiving general data and word data in respect of user, processing the data and based on the received data, creating a personal profile of the user. The personal profile of the user is stored in data storage 440. According to certain embodiments, where a personal profile of a user already exists in database 440, profile generating engine is configured 420 to process user's general data and word data and to update the existing personal profile accordingly. According to certain embodiments, profile generating engine 420 is further configured for receiving and analyzing a core-text. As mentioned above with reference to FIG. 1 core-text may be provided by any suitable input means (e.g. transmitted via a network, retrieved from a computer storage medium, etc.). Core-text is stored in a data storage associated with the system 440.

According to certain embodiments, annotation engine 430 is configured for generating a personalized annotated text of a core-text, based on at least the personal profile of the user. The annotation engine is configured to process the available information of the personal profile of the user and provide the user with annotations on the core-text. According to certain embodiments annotations include definitions and/or translations of textual elements in the core text (i.e. gloss). The annotations are specifically adapted to the knowledge of each specific user.

According to certain embodiments, after being generated, the personal annotated text is displayed to the user. As mentioned above, the personal annotated text may be displayed by any display means associated with the client 450 (e.g. computer display, PDA, cell phone etc.). According to one embodiment, the annotated text is displayed to the user after it has been printed.

Figure 5:
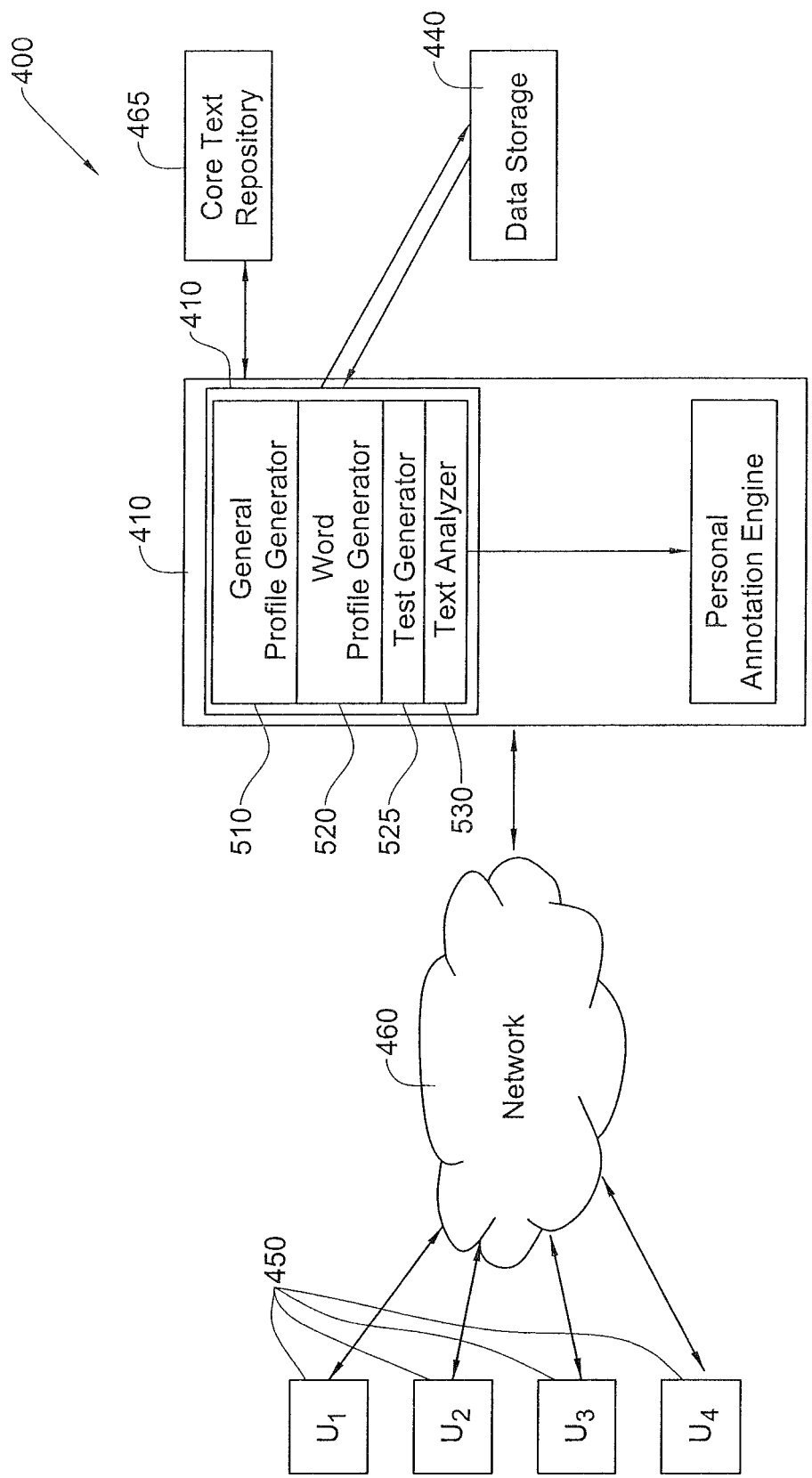
FIG. 5 is a schematic illustration of the system architecture, in accordance with an embodiment of the invention.

FIG. 5 is a schematic illustration of the system architecture, in accordance with an embodiment of the invention, for carrying out the above described method of automatic generation of personalized annotated text of a core-text. As shown in FIG. 5 profile generating engine 420 may comprise a general profile generating module 510, a word profile generating module 520, and a text analyzer 530.

According to certain embodiments, general profile generating module 510 is configured for generating and/or updating the general profile of a user. General data is received by system 410 from the user and transmitted to the general profile generating module 510 which in turn process the data and creates the general profile of the user. According to certain embodiments, word profile generating engine 520 is configured for generating and/or updating the word profile of a user. Word data is received by system 410 and transmitted to the word data generating module 520 which in turn process the word data and creates the word profile of the user. According to certain embodiments, the operations described above with reference to stages 306 and 310 in FIG. 3 are preformed by the general profile generating module 510 and the word profile generating module 520. According to certain embodiments, system 410 comprises a test generator 525, which is configured for generating tests directed for testing the knowledge of a user and acquiring word data and general data utilized for the construction of the word profile and general profile of the user. In the event that the current user is not a new user and a personal profile of the current user already exists (e.g. stored in data storage 440) the test generator 525 may create tests based on the information which is recorded in the user's personal profile which is stored in the system data storage 440. According to certain embodiments, the profile generating engine 420 comprises a text analyzer 530 configured for analyzing the core-text and utilizing the information for creating and updating the general profile and the word profile of the user. Once the core-text is analyzed the test generator may generate tests which are based on the content of the core-text. For example, the test generator 525 may generate questions directed for testing the knowledge of the user in respect of textual elements which are found in the core-text and thereby improve the generation of the word profile. Information which is obtained by the text analyzer 530 also assists in the generation of the personalized annotated text as specified above with reference to FIG. 3.

According to certain embodiments, an annotation engine 430 is configured for generating a personalized annotated text (previously referred to as PAP). The operations of the annotation engine include at least inserting annotations into the core-text, wherein the annotation are adapted to the personal profile of each user. The annotation engines 430 takes into consideration the information in respect of the user, now available from the personal profile and information with regard to the core-text and generates a personalized annotated text as described above with reference to FIG. 3. Core-text may be acquired directly from the user via a client 450. Alternatively or additionally core-text may be acquired from any other repository 465 directly or indirectly connected to system 410.

It should be noted that in some embodiments, the division of the system into the specific components as shown in FIG. 4 and FIG. 5, may be different, and some or all of the components may be separated into a plurality of components or otherwise combined with any other component(s). In some embodiments, the system includes less, more and/or different modules than shown in FIG. 4 and FIG. 5. In other embodiments of the invention any component of the system may provide less functionality, more functionality and/or different functionality than the functionality provided by the modules illustrated in FIG. 4 and FIG. 5. According to different embodiments, each of the modules of the system may be made up of different combinations of software, hardware and/or firmware capable of performing the functions described and defined herein The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. It is intended that the scope of the invention be limited only by the claims and that the claims be interpreted to include all such variations and combinations.

The invention claimed is:

1. A method of automatic generation of personalized annotated text, of a core-text, the method comprising:
   a. acquiring profile data in respect of a user;
   b. utilizing a processor configured to process said data and generate a personal profile of said user; said personal profile being indicative of a proficiency level of said user in respect of said text, and the proficiency level being indicative of knowledge of the user with respect to a meaning of one or more word-elements; the generation of the personal profile includes using one or more frequency lists configured to assess the proficiency level of the user; and
   c. generating a personalized annotated text of said core text based on at least said personal profile of said user; said annotated text including at least a gloss of at least a part of said core text; the generation of the personalized annotated text includes using information with respect to the one or more frequency Lists in the personal profile to determine which of the one or more word-elements in the core text are to be annotated in the personalized annotated text.

2. The method of claim 1, further comprising:
performing one or more tests for obtaining the proficiency level, the tests including at least one test which is not based on spoken responses uttered by the user.

3. The method of claim 2, further comprising:
analyzing said core text and generating said tests based on said core text.

4. The method of claim 1, wherein said determining a personal profile of said user in (c) includes at least the following:
   i. testing knowledge of said user in respect of one or more textual elements, and associating a score to each of said one or more textual elements, said score being indicative of the user's knowledge in respect of said one or more textual elements.

5. The method of claim 1, wherein said generating a personalized annotated text of said core text based on at least said personal profile of said user in (d) comprises:
determining the user's proficiency level in respect of said core text and adapting said personalized annotation to said proficiency level.

6. The method of claim 1, wherein said generating a personalized annotated text in (d) further comprises analyzing said core text, determining important textual elements and adapting said gloss to include annotations with respect to important textual elements which are unknown to said user.

7. The method of claim 1, wherein said one or more word-elements include at least one word element which has more than one meaning.

8. The method according to claim 1, wherein the core-text is in a first language and the personalized annotated text comprises a translation of at least one word element in said core-text to a corresponding word in at least one other language.

9. The method according to claim 1, wherein the generation of the personalized annotated text further includes:
determining which of the word-elements in the core text should be annotated in the personalized annotated text based on information indicative whether any one of the word-elements in the core text has appeared repeatedly in previous glosses provided to the user.

10. The method according to claim 1, wherein the generation of the personalized annotated text further includes:
determining which of the word-elements in the core text should be annotated in the personalized annotated text using information indicative whether any one of the word-elements has cognate words that appears in a language well known to the user.

11. A system for automatic generation of personalized annotated text, of a core-text, the system comprising:
a profile generating engine operatively connected to at least one processor, being responsive to received profile data in respect of a user and configured to generate a personal profile of said user based on said profile data; said personal profile being indicative of a proficiency level of the user, the proficiency level being indicative of knowledge of the user with respect to a meaning of one or more word-elements; the generating of the personal profile includes using one or more frequency lists configured to assess the proficiency level of the user;
a data storage configured for storing said personal profile of said user;
an annotation engine configured to generate a personalized annotated text of said core text, based on at least said personal profile of said user, said annotated text including at least a gloss of at least part of said core text; the generating of the personalized annotated text includes using information with respect to the one or more frequency lists in the personal profile to determine which of the word-elements in the core text should be annotated in the personalized annotated text.

12. The system of claim 11, further comprising a computer display for displaying said annotated text.

13. The system of claim 11, wherein said profile data includes at least general data of said user and world data of said user.

14. The system of claim 11, further comprising:
a test generating engine configured to generate one or more tests directed to obtain the proficiency level, the tests including at least one test which is not based on spoken responses uttered by the user.

15. The system of claim 14, further comprising:
a text analyzer configured to analyze said core text, wherein said one or more tests are generated based on said core text.

16. The system of claim 11, wherein said profile generating engine is configured to perform at least the following:

a. testing the knowledge of said user in respect of one or more textual elements, and associating a score to each of said one or more textual elements, said score being indicative of the user's knowledge in respect of said one or more textual elements.

17. The system of claim 11, further comprising:
a text analyzer configured to analyze said core text, determining important textual elements and adapting said gloss to include annotations with respect to important textual elements which are unknown to said user.

18. The system according to claim 11, wherein the generation of the personalized annotated text further includes:
determining which of the word element in the core text should be annotated in the personalized annotated text using information indicative whether any one of the word-elements has cognate words that appears in a language well known to the user.

19. A program storage device readable by machine, tangibly embodying a program of instructions executable by the machine to perform method steps of automatic generation of personalized annotated text of a core-text, the method comprising:

a. acquiring profile data in respect of a user;
b. utilizing a processor configured to process said data and determine a personal profile of said user, said personal profile being indicative of a proficiency level of said user in respect of said text, the proficiency level being indicative of knowledge of the user with respect to a meaning of one or more word-elements; the generation of the personal profile including using one or more frequency lists to assess the proficiency of the user; and
c. generating a personalized annotated text of said core text based on at least said personal profile of said user; said annotated text including at least a gloss of at least a part of said core text; the generation of the personalized annotated text including using information with respect to the one or more frequency lists in the personal profile to determine which of the word-elements in the core text should be annotated in the personalized annotated text.

20. A computer program product comprising a non-transitory computer useable medium having computer readable program code embodied therein of automatic generation of personalized annotated text of a core-text, the computer program product comprising:

computer readable program code configured to cause the computer to acquire profile data in respect of a user;
computer readable program code configured to cause the computer to utilize a processor to process said data and determine a personal profile of said user, said personal profile being indicative of a proficiency level of said user in respect of said text, the proficiency level being indicative of knowledge of the user with respect to a meaning of one or more word-elements;
the generation of the personal profile including using one or more frequency lists to assess the proficiency of the user;
computer readable program code configured to cause the computer to generate a personalized annotated text of said core text based on at least said personal profile of said user; said annotated text including at least a gloss of at least a part of said core text; the generation of the personalized annotated text including using information with respect to the one or more frequency lists in the personal profile to determine which of the word-elements in the core text should be annotated in the personalized annotated text.

\* \* \* \* \*